(12) United States Patent
Cambou et al.

(10) Patent No.: US 11,343,109 B2
(45) Date of Patent: May 24, 2022

(54) SECURE ENROLLMENT FOR PHYSICAL UNCLONABLE FUNCTION DEVICES

(71) Applicant: Arizona Board of Regents on Behalf of Northern Arizona University, Flagstaff, AZ (US)

(72) Inventors: Bertrand F Cambou, Flagstaff, AZ (US); David Hely, Grenoble (FR)

(73) Assignee: ARIZONA BOARD OF REGENTS ON BEHALF OF NORTHERN ARIZONA UNIVERSITY, Flagstaff, AZ (US)

( * ) Notice: Subject to any disclaimer, the term of this patent is extended or adjusted under 35 U.S.C. 154(b) by 16 days.

(21) Appl. No.: 16/900,675

(22) Filed: Jun. 12, 2020

(65) Prior Publication Data
US 2020/0396092 A1 Dec. 17, 2020

Related U.S. Application Data

(60) Provisional application No. 62/860,463, filed on Jun. 12, 2019.

(51) Int. Cl.
*H04L 9/40* (2022.01)
*H04L 9/32* (2006.01)
*H04L 9/08* (2006.01)

(52) U.S. Cl.
CPC .......... *H04L 9/3278* (2013.01); *H04L 9/0838* (2013.01); *H04L 9/0869* (2013.01); *H04L 9/3234* (2013.01); *H04L 2209/12* (2013.01)

(58) Field of Classification Search
CPC ... H04L 9/3278; H04L 9/0869; H04L 9/0838; H04L 9/3234; H04L 2209/12
See application file for complete search history.

(56) References Cited

U.S. PATENT DOCUMENTS 6,981,191 B2 12/2005 Dorsey
8,694,778 B2 4/2014 Teuwen et al.
(Continued)

OTHER PUBLICATIONS

Cortez et al., "Testing PUF-Based Secure Key Storage Circuits", Design, Automation and Test in Europe, Mar. 2014, Dresden, Germany, https://hal-https://hal-lirmm.ccsd.cnrs.fr/lirmm-01234141, DOI: 10.7873/DATE.2014.207, 6 pages.
(Continued)

*Primary Examiner* — Thaddeus J Plecha
(74) *Attorney, Agent, or Firm* — Quarles & Brady LLP

(57) ABSTRACT

Systems and methods for secure enrollment of physical unclonable function devices include providing a device with an enrollment controller. The enrollment controller receives an enrollment request from an enrollment system and authenticates the request. If the request is authentic, the enrollment controller generates challenges in a pseudorandom order determined by a random seed that is shared with the enrollment system. The enrollment controller issues the challenges to interrogation circuitry coupled to a PUF array and records the responses. The responses are transmitted in encrypted form, and in the pseudorandom order, to the enrollment system. The responses are encrypted using a random number shared with the enrollment system. The enrollment system and the enrollment controller can independently generate the encryption key using the shared random number and/or other securely shared information.

18 Claims, 10 Drawing Sheets

(56) References Cited

U.S. PATENT DOCUMENTS

| | | | |
|---|---|---|---|
| 9,742,563 B2 | 8/2017 | Gotze et al. | |
| 10,146,464 B2 | 12/2018 | Murray et al. | |
| 10,256,983 B1* | 4/2019 | Bauer | H04L 9/0861 |
| 2011/0219233 A1* | 9/2011 | Zhang | H04L 9/302 |
| | | | 713/171 |
| 2012/0266221 A1* | 10/2012 | Castelluccia | H04L 63/0492 |
| | | | 726/5 |
| 2013/0031356 A1* | 1/2013 | Prince | H04L 9/3268 |
| | | | 713/151 |
| 2018/0248690 A1* | 8/2018 | Fukuda | H04L 63/12 |
| 2019/0007222 A1* | 1/2019 | Noguchi | H04L 9/3278 |
| 2019/0138753 A1* | 5/2019 | Wallrabenstein | G09C 1/00 |
| 2021/0004461 A1* | 1/2021 | Guilley | G01R 31/31719 |

OTHER PUBLICATIONS

Da Silva et al., "Scan chain encryption for the test, diagnosis and debug of secure circuits", ETC: European Test Symposium, May 2017, Limassol, Cyprus, https://hal-lirmm.ccsd.cnrs.fr/lirmm-01699254, DOI: 10.1109/ETS.2017.7968248, 7 pages.

Da Silva et al., "A New Secure Stream Cipher for Scan Chain Encryption", IVSW: International Verification and Security Workshop, Jul. 2018, Platja d'Aro, Spain, https://hal-lirmm-01867256, DOI: 10.1109/IVSW.2018.8494852, 7 pages.

Hely et al., "Test Control for Secure Scan Designs", Proceedings of the European Test Symposium (ETS '05), Tallinn, Estonia, 2005, https://ieeexplore.ieee.org/abstract/document/1430029, 6 pages.

Pradhan et al., "GLFSR—A New Test Pattern Generator for Built-in-Self-Test", IEEE Transactions on Computer-Aided Design of Intergrated Circuits and Systems, vol. 18, No. 2, Feb. 1999, 10 pages.

\* cited by examiner

```
┌─────────────────────────────────────────────────────────────────────────────┐
│ DETECTING THE PRESENCE OF A TEST UNIT CONNECTED TO A COMMUNICATION INTERFACE│
│ VIA A COMMUNICATION PORT OF AN ELECTRONIC DEVICE HAVING A PHYSICAL          │
│ UNCLONABLE FUNCTION (PUF) ARRAY OF PUF DEVICES.                       1010  │
└─────────────────────────────────────────────────────────────────────────────┘
                                     │
┌─────────────────────────────────────────────────────────────────────────────┐
│ RECEIVE AUTHENTICATION SIGNALS AND AN ENROLLMENT INSTRUCTION FROM THE TEST  │
│ UNIT VIA THE COMMUNICATION INTERFACE AND DETERMINE, USING THE AUTHENTICATION│
│ SIGNALS, THAT THE ENROLLMENT INSTRUCTION IS AUTHENTIC.                1020  │
└─────────────────────────────────────────────────────────────────────────────┘
                                     │
┌─────────────────────────────────────────────────────────────────────────────┐
│ GENERATE A SET OF CHALLENGES AND GENERATE A CORRESPONDING SET OF RESPONSES  │
│ TO THE SET OF CHALLENGES.                                                   │
│ ┌─────────────────────────────────────────────────────────────────────────┐ │
│ │ CAUSE INTERROGATION CIRCUITRY COUPLED TO THE PUF ARRAY TO MEASURE       │ │
│ │ PHYSICAL CHARACTERISTIC VALUES OF PUF DEVICES IDENTIFIED BY EACH        │ │
│ │ CHALLENGE OF THE SET OF CHALLENGES                               1030A  │ │
│ └─────────────────────────────────────────────────────────────────────────┘ │
│ ┌─────────────────────────────────────────────────────────────────────────┐ │
│ │ OUTPUT RESPONSE DATA FOR EACH CHALLENGE THAT INDICATES AN EXPECTED      │ │
│ │ RESPONSE TO THAT CHALLENGE USING THE MEASURED PHYSICAL CHARACTERISTIC   │ │
│ │ VALUES OF THE OF PUF DEVICES IDENTIFIED BY THAT CHALLENGE.       1030B  │ │
│ └─────────────────────────────────────────────────────────────────────────┘ │
│                                                                       1030  │
└─────────────────────────────────────────────────────────────────────────────┘
                                     │
┌─────────────────────────────────────────────────────────────────────────────┐
│ ENCRYPT RESPONSE DATA INDICATING THE RESPONSE TO EACH CHALLENGE AND         │
│ TRANSMIT THE ENCRYPTED RESPONSE DATA TO THE TEST UNIT.                1040  │
└─────────────────────────────────────────────────────────────────────────────┘
```

SECURE ENROLLMENT FOR PHYSICAL UNCLONABLE FUNCTION DEVICES

CROSS-REFERENCE TO RELATED APPLICATIONS

The present application claims priority to U.S. Provisional Application 62/860,463 entitled "Secure Enrollment of Physical Unclonable Functions" and filed on Jun. 12, 2019.

BACKGROUND OF THE INVENTION

Physical Unclonable Functions (PUF) arrays are hardware primitives, which rely on intrinsic manufacturing variations introduced during fabrication to produce an array of circuit elements with one or more characteristics that are unique, unpredictable, and unclonable. A PUF measures a chosen physical parameter to extract a unique chip signature. A logical circuit receives a digital challenge and returns a response back depending on both the challenge and the physical function. Each PUF array is characterized by challenge response pairs (CRP) which may be stored in a database, representing measured characteristics of devices identified by the challenges. A PUF array can be used to provide on chip authentication data or keys which are unique to each device.

BRIEF SUMMARY

In an embodiment, a system, comprises enrollment circuitry and a communication interface coupled to the enrollment circuitry and a communication port; a physical unclonable function (PUF) array of PUF devices; and interrogation circuitry coupled to the enrollment circuitry and the PUF array and configured to measure physical characteristics of the PUF devices. The enrollment circuitry is configured to: detect the presence of a test unit connected to communication interface via the communication port; receive an enrollment instruction via the communication interface from a test unit; receive authentication signals from the test unit via the communication interface; determine, using the authentication signals, that the enrollment instruction is authentic; generate a set of challenges; and generate a corresponding set of responses to the set of challenges by: causing the interrogation circuitry to measure physical characteristic values of PUF devices identified by each challenge of the set of challenges; and outputting response data for that challenge that indicates an expected response to that challenge using the measured physical characteristic values of the of PUF devices identified by that challenge. The enrollment circuitry is further configured to encrypt response data indicating the response to each challenge of the set of challenges; and transmit the encrypted response data to the test unit via the communication port.

In some embodiments, the enrollment circuitry, when generating the set of challenges, outputs, as the set of challenges, a set of pseudo-random numbers determined by a seed value derived from a first random number and the authentication signals received from the test unit.

In some embodiments, the enrollment circuitry, when causing the interrogation circuitry to measure the physical characteristic values of the PUF devices identified by each challenge, causes interrogation circuitry to: repeatedly measure a physical characteristic of each PUF device identified by that challenge; and output, as the measured physical characteristic value of each PUF device, data indicating one or more statistical properties of the repeatedly measured physical characteristic of that PUF device.

In some embodiments, the enrollment circuitry is further configured to transmit a random token value to the enrollment system via the communication interface; compare the authentication information received from the test unit to digest value produced by hashing the random token value and a password shared by the system and the enrollment system; and output a signal indicating that the enrollment instructing is authentic. In some embodiments the enrollment circuitry is further configured to transmit a second random value to the test unit; derive an encryption key from the second random value; and encrypt the response data using the encryption key.

In some embodiments, PUF array comprises PUF devices of one of the following types: SRAM cells; ring oscillator circuits; gate delay circuits; resistive memory devices; ferroelectric memory devices; phase change memory devices; magnetic memory devices; flash memory devices; and one-time programmable memory devices.

In another embodiment, a system comprises processing circuitry and a communication interface coupled to the processing circuitry; a physical unclonable function (PUF) array of PUF devices; interrogation circuitry coupled to the processing circuitry and the PUF array and configured to measure physical characteristics of the PUF devices; and memory coupled to the processing circuitry and storing instructions. The instructions, when executed by the processing circuitry, cause the system to receive an enrollment instruction via the communication interface from an enrollment system; receive authentication information from the enrollment system via the communication interface; determine, using the authentication information, that the enrollment instruction is authentic; and generate a set of challenges. Executing the instructions further causes the system to generate a corresponding set of responses to the set of challenges by causing the interrogation circuitry to measure physical characteristic values of PUF devices identified by each challenge of the set of challenges; and outputting response data for that challenge that indicates an expected response to that challenge using the measured physical characteristic values of the of PUF devices identified by that challenge. Executing the instructions further causes the system to encrypt response data indicating the response to each challenge of the set of challenges; and transmit the encrypted response data to the enrollment system via the communication interface.

In another embodiment, a method comprises detecting the presence of a test unit connected to a communication interface via a communication port of an electronic device having a physical unclonable function (PUF) array of PUF devices; receiving an enrollment instruction via the communication interface from the test unit; receiving authentication signals from the test unit via the communication interface; determining, using the authentication signals, that the enrollment instruction is authentic; and generating a set of challenges. The method further comprises generating a corresponding set of responses to the set of challenge instructions by causing interrogation circuitry coupled to the PUF array to measure physical characteristic values of PUF devices identified by each challenge of the set of challenges; and outputting response data for that challenge that indicates an expected response to that challenge using the measured physical characteristic values of the of PUF devices identified by that challenge. The method further comprises encrypting response data indicating the response to each challenge of the set of challenges; and transmitting the encrypted response data to the test unit.

The above features and advantages of the present invention will be better understood from the following detailed description taken in conjunction with the accompanying drawings.

BRIEF DESCRIPTION OF THE DRAWINGS

The drawings described herein constitute part of this specification and includes exemplary embodiments of the present invention which may be embodied in various forms. It is to be understood that in some instances, various aspects of the invention may be shown exaggerated or enlarged to facilitate an understanding of the invention. Therefore, drawings may not be to scale.

FIG. 10 is a flowchart illustrating an example enrollment procedure.

DETAILED DESCRIPTION

The described features, advantages, and characteristics may be combined in any suitable manner in one or more embodiments. One skilled in the relevant art will recognize that the circuit may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus appearances of the phrase "in one embodiment," "in an embodiment," and similar language throughout this specification may, but do not necessarily, all refer to the same embodiment.

Authentication of devices provided with a PUF array requires that the PUF array is "enrolled." That is, a remote device must store or otherwise have access to the expected response to each challenge issued to the PUF array (or data sufficient to derive expected responses). While enrollment may be accomplished by simply generating every possible challenge and sequentially recording the response to each challenge, this method is time consuming. It is desirable to provide functionality to efficiently generate and transmit a large number of challenge responses for enrollment purposes. However, it is important that such functionality not be exposed to ordinary users or potential adversaries in order to avoid compromising security.

Accordingly, the present disclosure describes systems and method to provide enhanced security during PUF enrollment cycles and subsequent authentication cycles. During enrollment, as done during the testing of integrated testing, test patterns are applied to the PUFs to generate test responses that are stored in secret look-up tables. During subsequent test cycles and authentication cycles, the same process is applied again to generate and compare test responses to the initial responses stored in the look-up tables.

Some elements that are applied during the novel enrollment schemes include during IC testing and authentication cycles, the correctness of the responses is checked as soon as possible; this checking is not critical during enrollment because the responses can be stored and processed later. Additionally, during IC testing and authentication, the test patterns applied to the PUF need to meet the full requirements, while during enrollment the database can only store a subset of the whole PUF CRPs space.

The novel schemes described herein combine the generic built-in logic and memory self-test (BIST) methods that speed up the PUF enrollment operations with dedicated security add-ons. An enrollment controller, which acts as a test controller, is added to the system to manage the enrollment in a secure way as depicted as the "Enrollment Controller" in FIG. 3.

Figure 1:
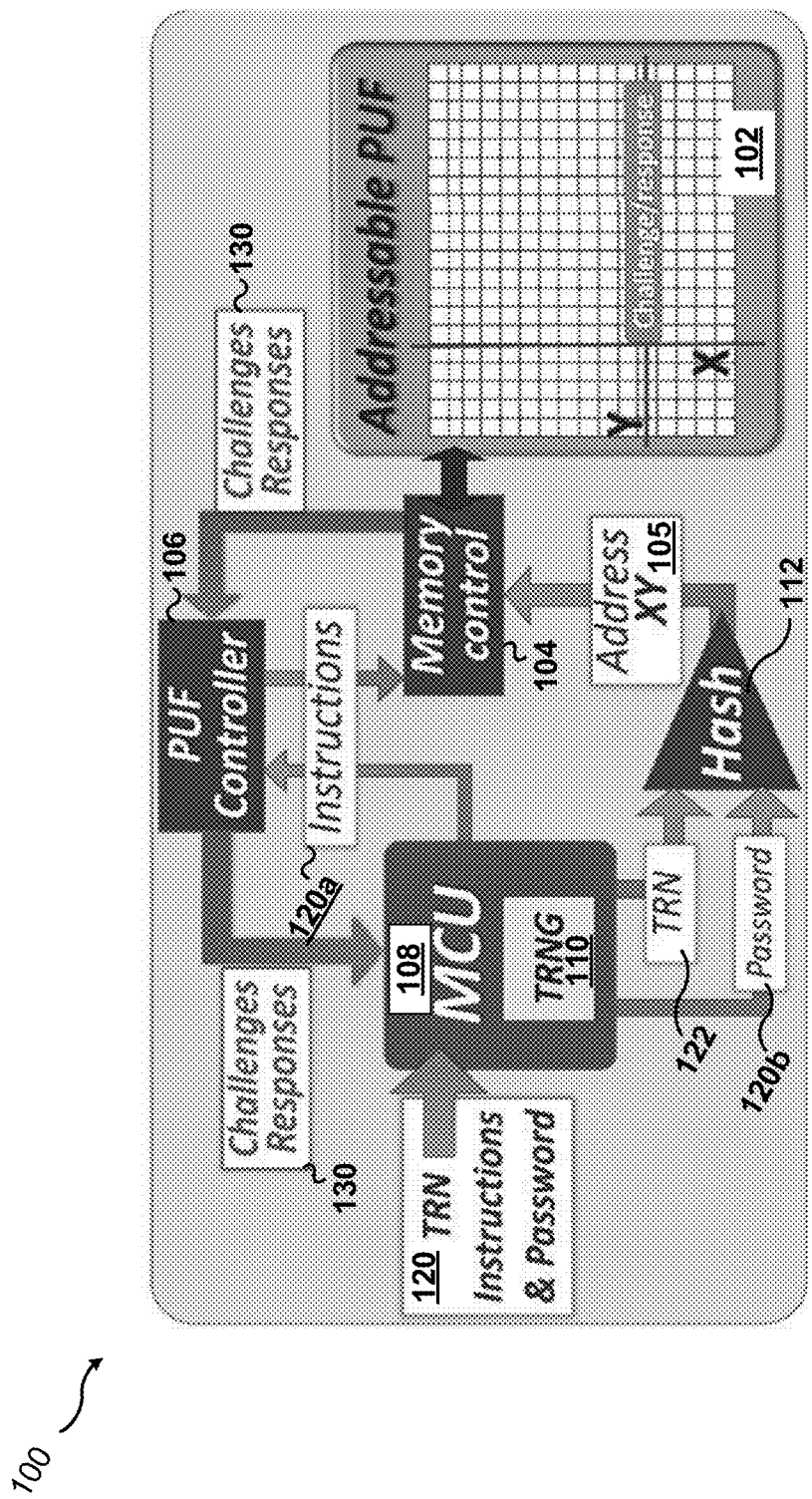
FIG. 1 depicts an addressable PUF generator ("APG") including a PUF array.

FIG. 1 illustrates an architecture used in an example embodiment 100 for securely sharing a key using an addressable PUF array 102 and multifactor authentication. The PUF array 102 (shown here as a 2D-array of cells) can be addressed using a memory controller 104, which receives a specified address 105. The memory controller 104 is configured to return characteristics of the PUF array 102 at the address 105, as a response 130. The responses 130 may be specific characteristic of queried cells (or ranges of cells), or may be derived from those characteristics. Non-limiting examples of such characteristics are time delays of transistor-based ring oscillators and transistor threshold voltages. Other non-limiting examples include optical devices. For example, a party may possess an optical PUF device which, when illuminated by a light source such as a laser produces a unique image. This image may be digitized and the pixels may be used to form an addressable PUF array.

In order for a party to use a PUF array such as the PUF array 102 to authenticate a device or user in possession of the PUF array, the party needs to securely exchange the information about the PUF array 102 with the user or device in possession of the PUF array (or another party from which that information can be securely retrieved), the measurements of physical elements describing the PUF (or information derived from those measurements). This can be a set of parameters, P, produced by measuring each cell of the PUF array 102 one or more times. A request to measure the parameters and/or perform further mathematical operations on those parameters may be variously referred to as "challenges." The initial measurements of the PUF, may be various referred to as "challenge responses," or simply "responses." Using this terminology, in one example, a first party generates a set of challenges during an enrollment process and issues challenges to a device that controls the PUF array (or a party in possession of the PUF array at the time of the initialization). The responses obtained to the initial challenges are stored for reference. When the first party (acting as a "transmitting" party) subsequently sends a challenge to a device controlling the PUF array, the device can independently re-measure the parameter(s) P at the specific locations of his PUF array to generate appropriate challenge responses. Challenges and the corresponding challenge responses represent a fingerprint of the PUF. With quality PUFs, the Hamming distance between challenges and responses is small.

As shown in FIG. 1, challenges may be generated by supplying a message 120 (which may include instructions 120*a* and a password 120*b*) to a microcontroller 108 or other suitable processing circuitry. The microcontroller 108 may include a random number generator such as the true-random-number generator (TRNG) 110 that generates a random number 122 that forms part of the instructions 120, which specify how to retrieve the challenge responses 130 using the memory controller 104. Alternatively, the random number or other instruction may be received from another party. The memory controller 104 receives the instructions 120*a* and the desired address 105 (or range of addresses) to query. The desired address 105 may be generated by a hash function 112 which hashes the combined password 120*b* and random number 122 to yield the address 105. Using the instructions 120 and the address 105, the memory controller 104 retrieves the appropriate challenge response 130 and delivers it to the PUF controller 106, which delivers the appropriate challenge response 130 to the microcontroller 108.

A PUF array may include ternary circuitry configured to natively return ternary values. As one nonlimiting example, the PUF array may be composed of ring oscillator circuits and the PUF array or attendant circuitry may be configured to produce a trit value that indicates whether one ring oscillator has a period that is longer or shorter than a second ring oscillator, or (approximately) equal to within a certain threshold. As another non-limiting example, a single ring oscillator may be used and the system may produce a trit indicating whether a given ring oscillator has a period in the in the first, second or third tertile of values for the ring oscillators of that array. In another non-limiting example, a PUF array may be comprised of SRAM cells, some of which may have non-deterministic bit values upon power-up. In such cases, cells which are always (or more than certain percentage of the time when cycled repeatedly) store a '1' upon being power-cycled may be assigned a first trit value (e.g. '+'), cells which always store a '0' may be assigned a second trit value (e.g., '−'), and trits whose values upon power cycling are between the two extremes may be assign a third trit value (e.g., 'E'). The measurements of individual devices of a PUF array may not be perfectly deterministic due to thermal effects, drift of device characteristics, or other error sources. In some such embodiments, a party issuing a challenge may transmit CRC, parity, checksum, or other suitable error-correction information to a party answering the challenge by measuring a PUF array. In other embodiments, the party controlling the PUF array may access previously-stored information suitable for use with an error-correction scheme.

Figure 2:
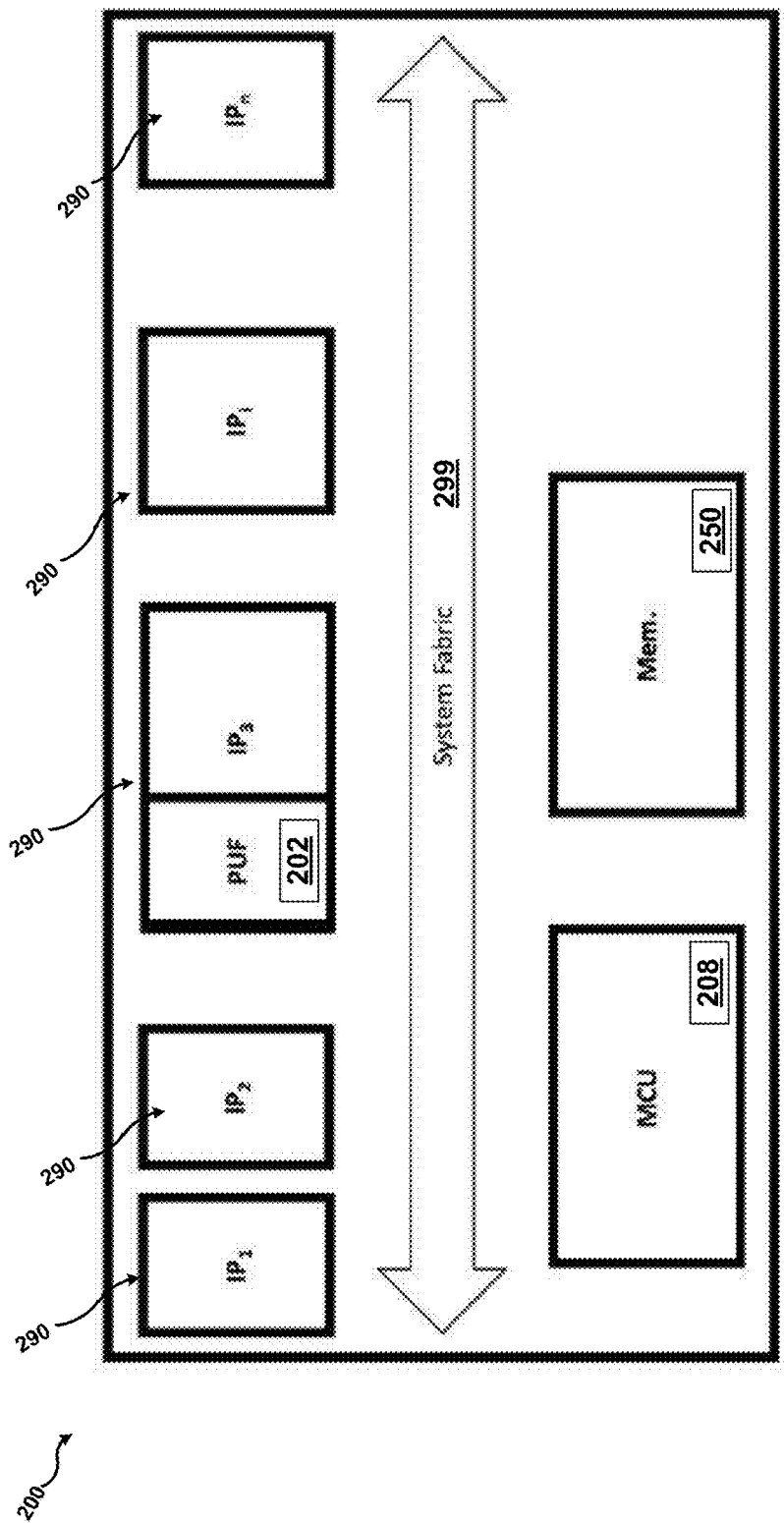
FIG. 2 depicts a system-on-chip (SoC), which embeds a PUF, according to one embodiment.
Figure 3:
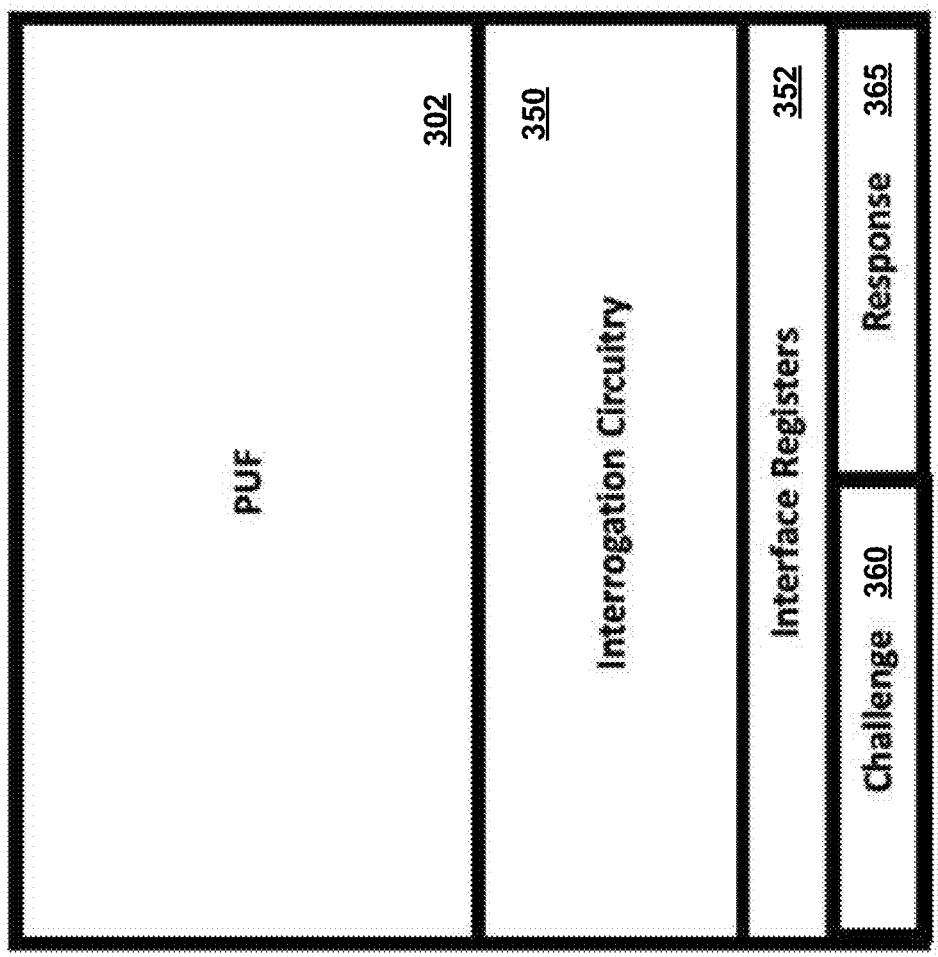
FIG. 3 depicts a generic PUF architecture, according to one embodiment.

FIG. 2 shows an example System on a Chip (SoC). As shown, the SoC 200 includes a microcontroller 208, memory 250 and various IP cores 290 (i.e., discrete logic assemblies configured to performed various functions), which may communicate via a common system interface fabric 299. The SoC 200 is provided with a PUF array 202 (e.g., the PUF array 102). In this example, the PUF array 202 is coupled to an IP core providing access to the PUF array 202. FIG. 3 shows an example architecture of a device 310 that provides access to a PUF array 302 (e.g., the IP core coupled and PUF array 202 in FIG. 2).

Figure 4:
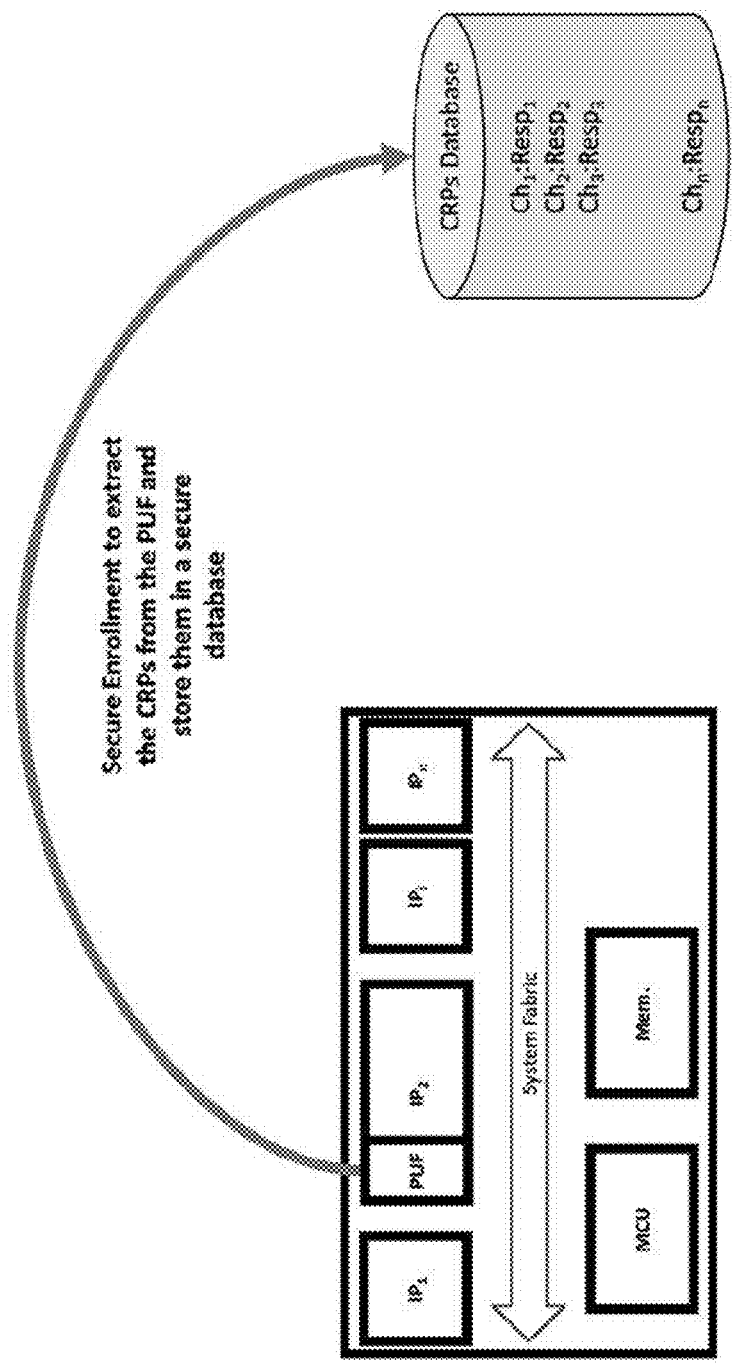
FIG. 4 depicts a PUF enrollment, according to one embodiment.

FIG. 3 depicts the architecture of an addressable PUF generator (APG 310; e.g. the embodiment 100 of FIG. 1) that provides access to a PUF array 302. The APG 310 includes interrogation circuitry configured to measure devices of the PUF array 302. As a non-limiting example, in embodiments in which the PUF array 302 is an array of devices characterized by resistance values, the interrogation circuitry 350 may include one or more constant current sources and voltage measurement circuitry configured to determine the resistances of selected PUF devices of the PUF array 302. The APG 310 also includes interface registers 352 used for storing information during the measurement and read-out processes. The interface register 352 are coupled to challenge registers 360 and response register 365. The challenge register 360 includes flip-flops that directly drive the PUF to apply a challenge while the PUF response register 365 includes flip-flops are connected to the PUF output used to capture PUF response values. As shown in FIG. 4, an APG such as the APG 310 can be queried and using various challenges and the results can be stored in an external database during enrollment.

Figure 5:
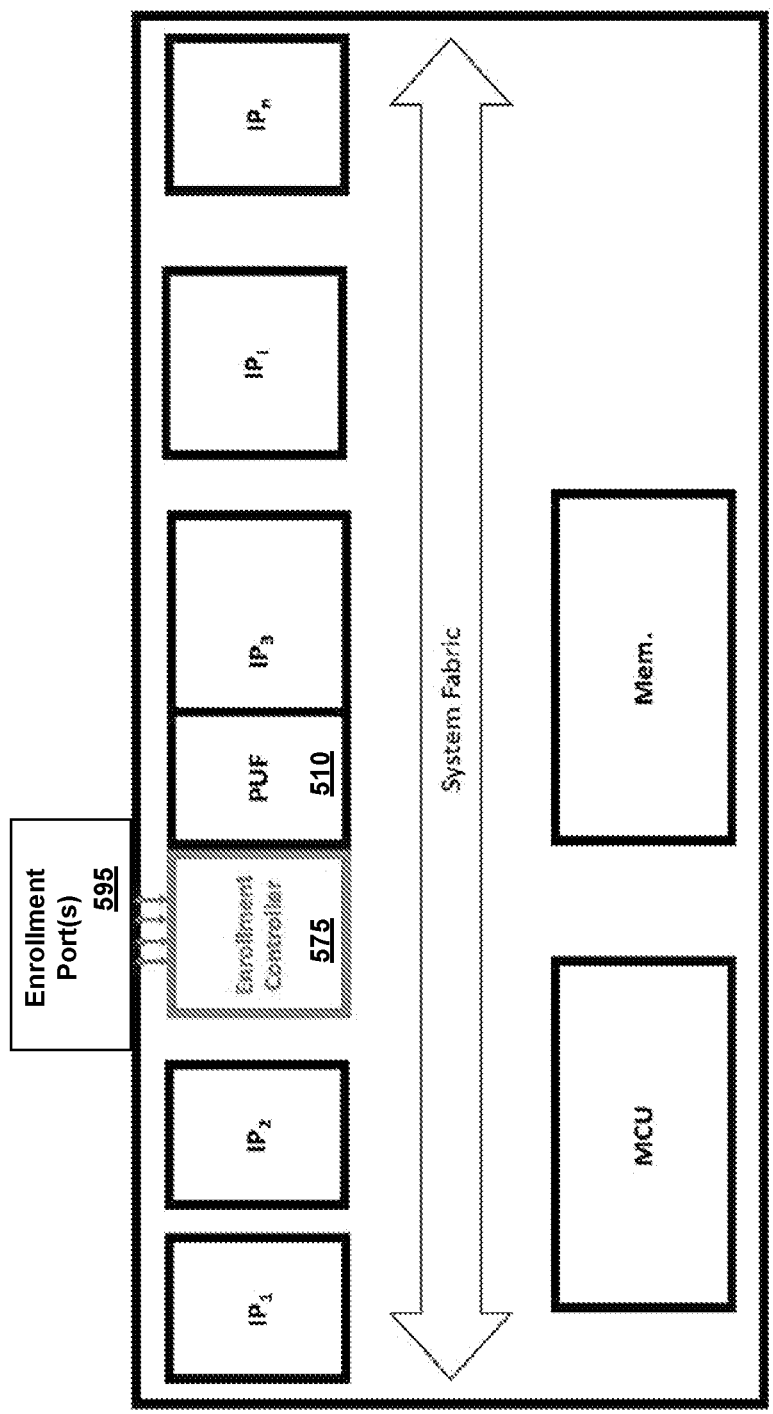
FIG. 5 depicts an enrollment controller within a system-on-a-chip, according to one embodiment.

FIG. 5 depicts a modified SoC 500 provided with an APG 510 (e.g., the APG 310). In order to enable functionality described herein, the SoC 500 is provided with an enrollment controller 575. The enrollment controller 575 is coupled to the APG 510 and to one or more enrollment ports 595 which provide access to the APG 510 specifically during enrollment processes. The enrollment port 595 may be a serial port, a parallel port, a radio transceiver, an IR transceiver, or any other suitable bidirectional communication interface.

During normal operation, the digital logic of the APG 310 controls access to the PUF array to avoid exposing bulk PUF data to rest of the system. During enrollment, one should set the PUF challenge register at all the necessary values to apply enough challenges. For each value of PUF challenge register, the PUF responses need to be output and stored within a database (as depicted by FIG. 4). The enrollment can be very time-consuming since a lot of data needs to be read from the PUF. To optimize enrollment, one embodiment of this invention uses a comprehensive hardware solution based on a scan chain and on-chip signal generator. A hardware module generates the challenge data on-chip (rather than sequentially receiving challenges from a remote device) to sense the PUF and a scan register is used to output the acquired data. Elements of this module are illustrated by FIGS. 6-7.

Figure 6:
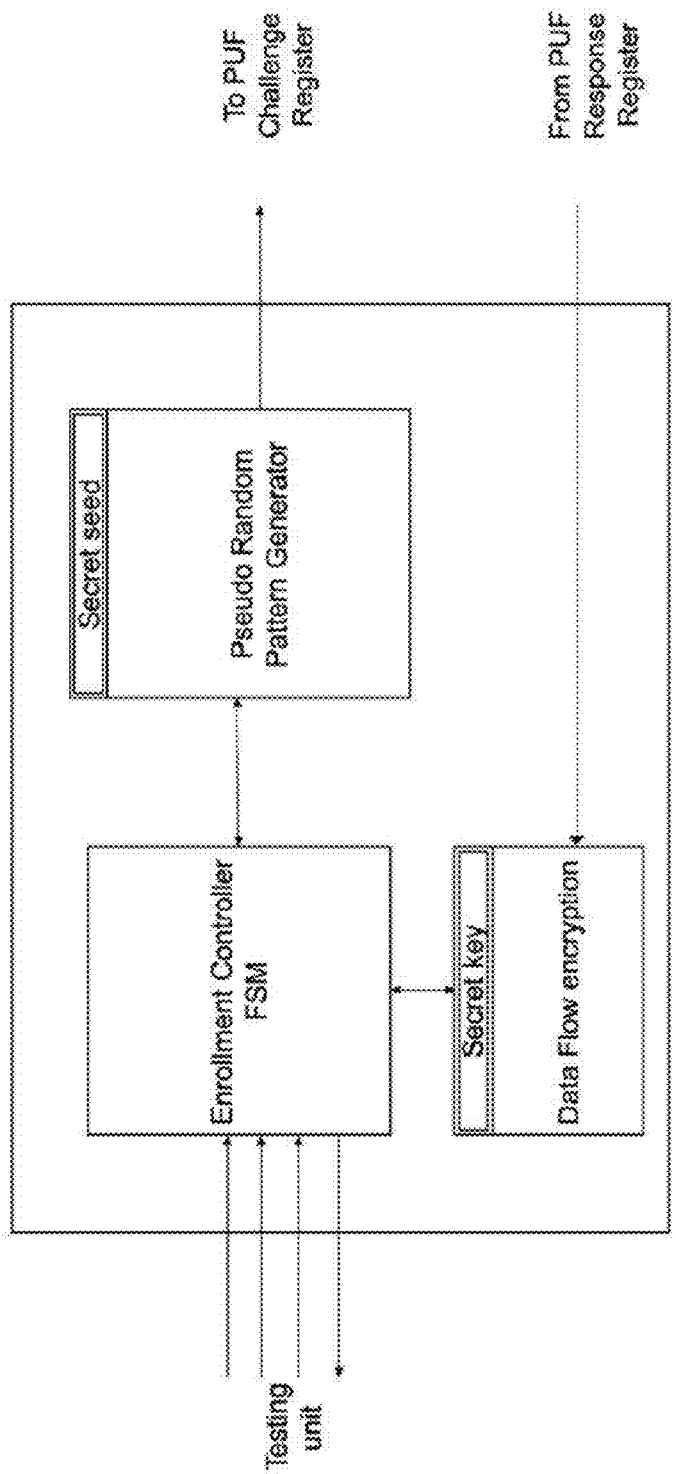
FIG. 6 depicts an enrollment controller architecture, according to one embodiment.
Figure 7:
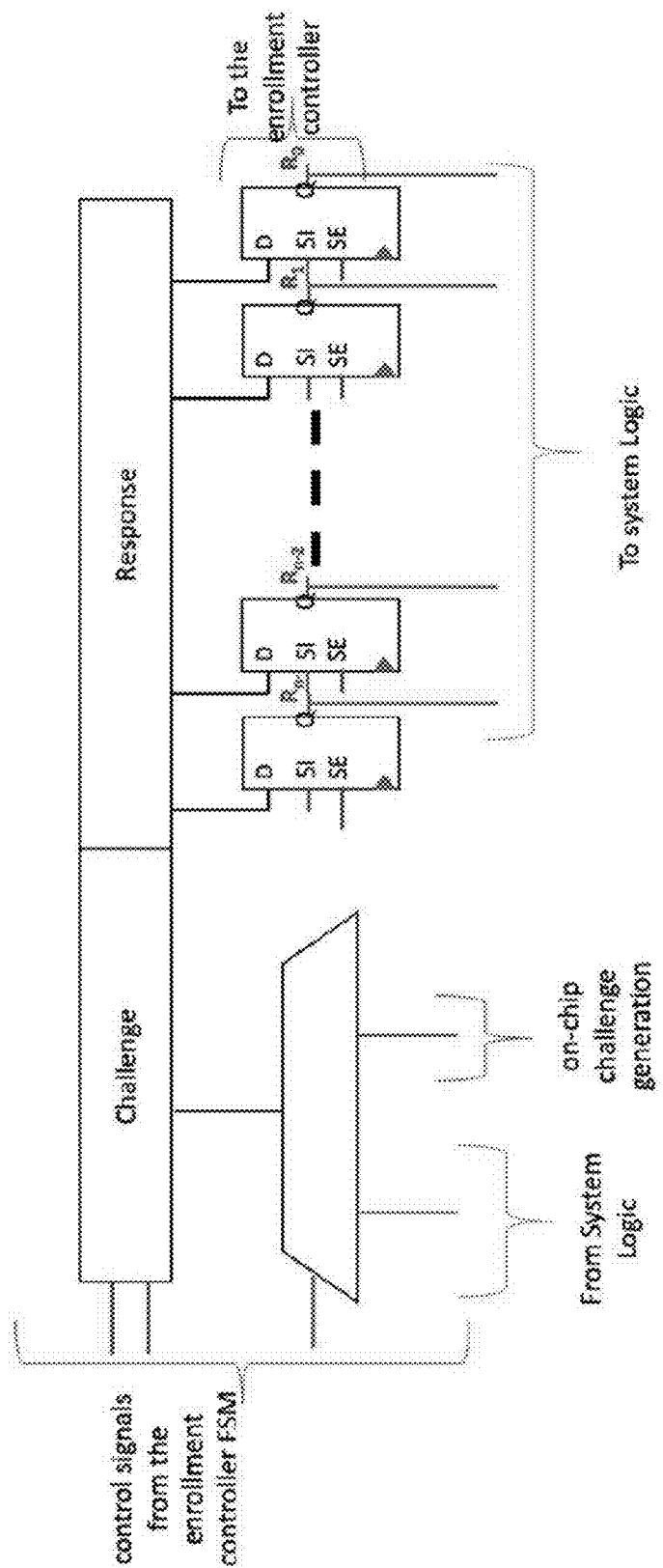
FIG. 7 depicts a PUF logic circuitry with enrollment logic, according to one embodiment.

FIG. 6 depicts dataflows in an enrollment controller 675 (e.g., the enrollment controller 575) in some embodiments. The enrollment controller detects the presence of a testing unit or other test device connected via enrollment port (e.g., the enrollment port 595). The enrollment controller accessed a secret stored seed value for use with a pseudorandom number generator. The enrollment controller randomly generates challenge values which are passed, one at a time to the challenge resister (e.g., the challenge register 360) of the connected APG (e.g., the APG 310). The enrollment controller receives the response to each challenge issued to the APG from the response resister (e.g., the response register 365) of the connected APG (e.g., the APG 310).

The Enrollment process is performed by repeating the following sequence for each challenge: 1) the on-chip challenge generator generates a challenge data; 2) the corresponding PUF response value $R_i$ is acquired in the PUF response register; 3) the scan chain is activated, and in n clock cycles, the values $R_i$ (i.e., resistance values in the example of PUF devices characterized by their resistances)

are shifted out via the configured serial register. To be secure, this hardware enrollment mechanism needs to be only activated by a strong and infrequent authentication cycle and the confidentiality of data being shifted out (the responses) have to be protected, for example, by cryptographic schemes. The extracted data may be vulnerable to exploits at two points (1) decrypting the response value, and (2) linking each response to a challenge. This information is not available to attackers when they do not know the initial seeds of the pseudo random pattern generators (PRPG) and the initial keys of the stream cipher. This is because, as illustrated by FIG. 6, the responses are generated in random order, and only the responses are transmitted off-chip via the enrollment port. FIG. 7 illustrates interaction of the APG (e.g., the APG 510) with an enrollment controller such as the enrollment controller 575.

FIG. 7 illustrates interaction of a test unit with an enrollment controller (e.g., the enrollment controller 575) via an enrollment port (e.g., the enrollment port 595). An agreed upon protocol establishes unique a PUF CRP generator seed (the seed initializes the pseudo-random pattern generator which generates the challenges; see FIG. 6) and encryption key for each device database during the enrollment based on a secret key buried in the device. Following the example protocol described in FIG. 8, both the test unit and the devices agree on a common key for the stream cipher and a random seed for the challenge generator, which are both securely generated on each side by the password and the exchanged random numbers. The controller initiates the enrollment, and the challenge generator produces the value $Gen_0$, which drives the PUF logic control. As a result, the PUF generates the value $R_0$ and encrypts it. The cipher value $R'_0$ is then shifted out to the test unit. The operation is performed n times with the n different values generated by the on-chip generator. The database contains then n ciphered PUF responses.

Figure 8:
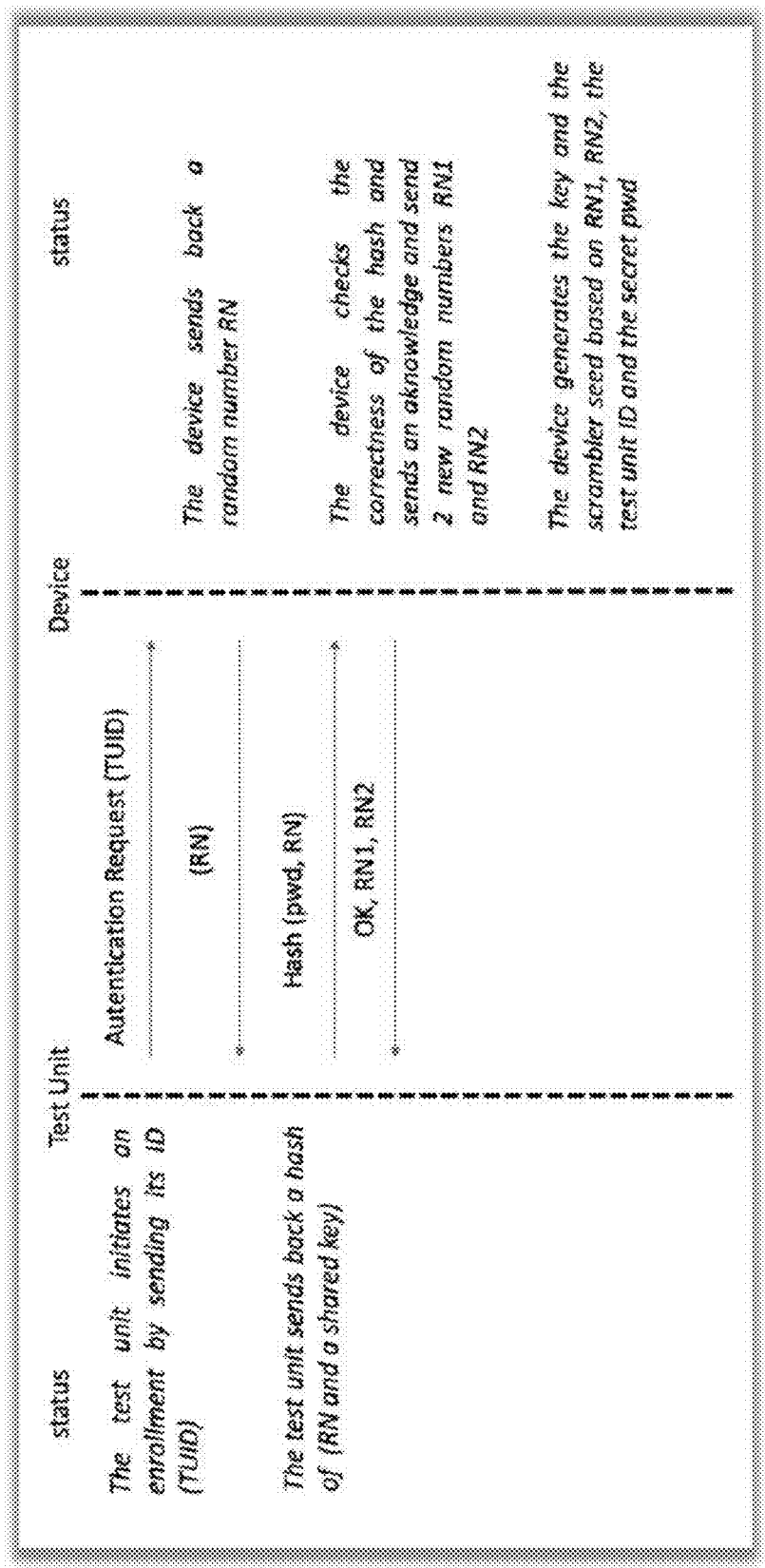
FIG. 8 depicts an enrollment secret key and seed generation, according to one embodiment.

FIG. 8 illustrates an example secure enrollment process. First, a test device sends an authentication request for a target APG via the enrollment port of its enrollment controller The enrollment port is a communication port which, in this example, is dedicated for use to communicate with the enrollment controller. The enrollment controller transmits a random number (RN). The test device than securely transmits a token or message whose value depends on the random number and the identity of the device, using a hashing function or other means to prevent the test unit's identity information from ever being transmitted directly (e.g., by hashing a combination of the random number with the test unit ID). The enrollment controller (which stores or accesses a list of authentic test unit IDs) then validates the hash and authenticates the test unit. The enrollment controller transmits two more random numbers. One may be used to seed the pseudorandom number generator (e.g., the PRNG of FIG. 6) and another may be used to generate or derive an encryption key. The test unit(s) and the enrollment controller each have instructions allowing them to independently generate the same seed value and the same encryption key from the two random numbers exchanged. This will allow the test unit to decrypt the response data and descramble the ordering of the responses in order to associate each response with the challenge used to generate it (i.e., the test unit can generate an identical pseudorandom number sequence given the same seed as the enrollment controller) w.

Figure 9:
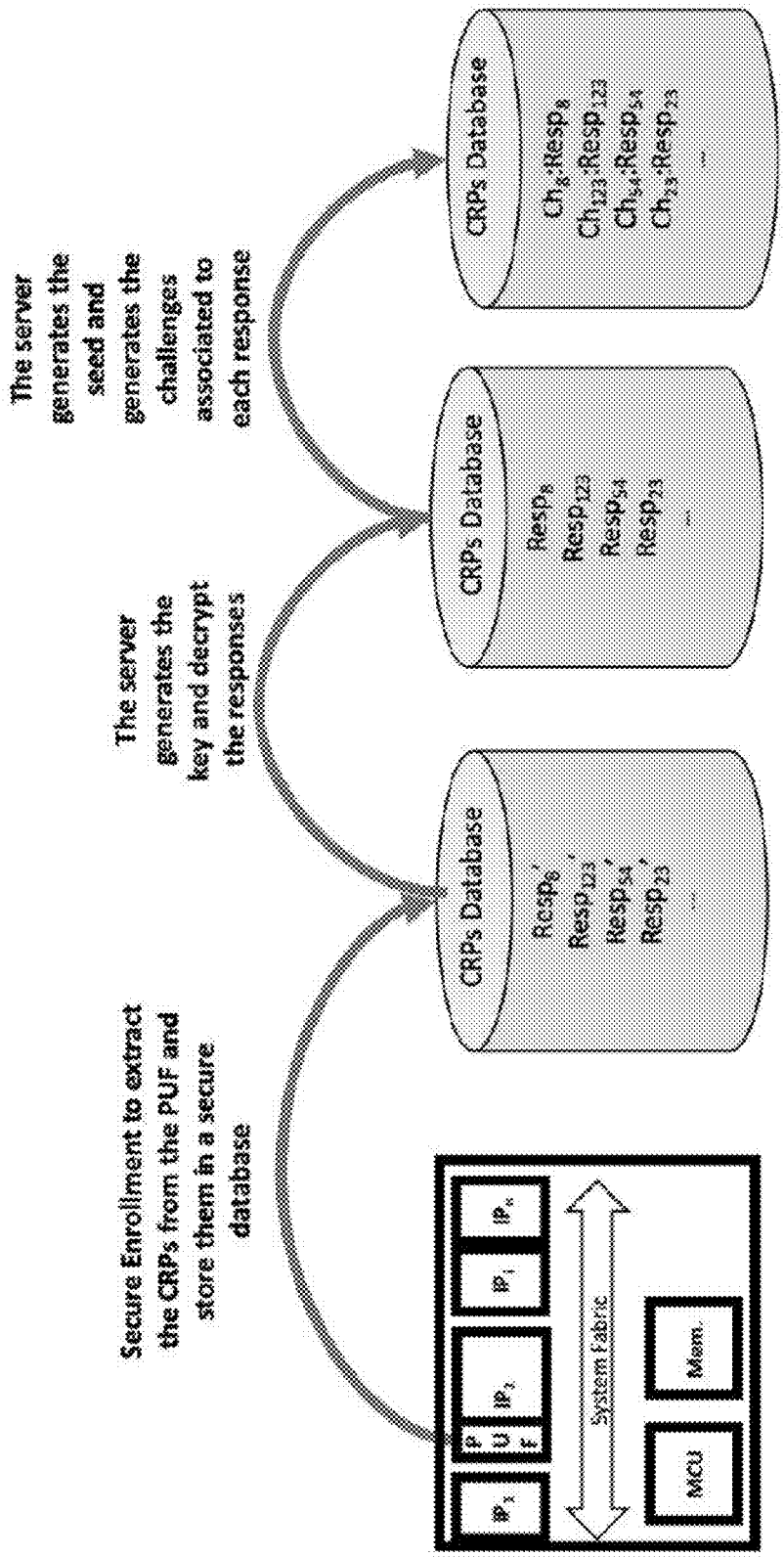
FIG. 9 depicts enrollment steps, according to one embodiment.

FIG. 9 further illustrates processing of enrollment data received from an APG by a server or other device. As shown, the server receives encrypted responses in a randomized order. The server decrypts the responses. Using information exchanged securely with the APG, the server associates each response with the challenge used to generate that response. The PUF CRP database can be re-constructed knowing the secret password and the exchanged random values RN1 and RN2. The database is first decrypted, and then the sequence generated on chip is re-generated on the server in order to associate a challenge to each value, which has been acquired. Finally, the PUF values are re-ordered to build the secure database, which will be used by the server during ordinary operation to authenticate the APG.

FIG. 10 is a flowchart illustrating an example enrollment procedure 1000 having steps 1010, 1020, 1030, and 1040 each of which may be performed by a system such as the SoC 510 using the enrollment controller 575, for example, or another suitable system having a PUF array. At step 1010, the system may detect the presence of a test unit connected to a communication interface via a communication port of an electronic device having a physical unclonable function (PUF) array of PUF devices. At step 1020, the system may receive an enrollment instruction via the communication interface and authentication signals from the test unit via the communication interface; and may determine, using the authentication signals, that the enrollment instruction is authentic. Step 1030 includes steps 1030A and 1030B. At step 1030, the system may generate a set of challenges and responses to those challenges. At step 1030A, the system may generate the corresponding set of responses to the set of challenge instructions by causing interrogation circuitry coupled to the PUF array to measure physical characteristic values of PUF devices identified by each challenge of the set of challenges. At step 1030B, the system may output response data for each challenge that indicates an expected response to that challenge using the measured physical characteristic values of the of PUF devices identified by that challenge. Finally, at step 1040 the system may encrypt the response data indicating the response to each challenge; and transmit the encrypted response data to the test unit.

In an embodiment, a system, comprises enrollment circuitry and a communication interface coupled to the enrollment circuitry and a communication port; a physical unclonable function (PUF) array of PUF devices; and interrogation circuitry coupled to the enrollment circuitry and the PUF array and configured to measure physical characteristics of the PUF devices. The enrollment circuitry is configured to: detect the presence of a test unit connected to communication interface via the communication port; receive an enrollment instruction via the communication interface from a test unit; receive authentication signals from the test unit via the communication interface; determine, using the authentication signals, that the enrollment instruction is authentic; generate a set of challenges; and generate a corresponding set of responses to the set of challenges by: causing the interrogation circuitry to measure physical characteristic values of PUF devices identified by each challenge of the set of challenges; and outputting response data for that challenge that indicates an expected response to that challenge using the measured physical characteristic values of the of PUF devices identified by that challenge. The enrollment circuitry is further configured to encrypt response data indicating the response to each challenge of the set of challenges; and transmit the encrypted response data to the test unit via the communication port.

In some embodiments, the enrollment circuitry, when generating the set of challenges, outputs, as the set of challenges, a set of pseudo-random numbers determined by a seed value derived from a first random number and the authentication signals received from the test unit.

In some embodiments, the enrollment circuitry, when causing the interrogation circuitry to measure the physical characteristic values of the PUF devices identified by each challenge, causes interrogation circuitry to: repeatedly measure a physical characteristic of each PUF device identified by that challenge; and output, as the measured physical characteristic value of each PUF device, data indicating one or more statistical properties of the repeatedly measured physical characteristic of that PUF device.

In some embodiments, the enrollment circuitry is further configured to transmit a random token value to the enrollment system via the communication interface; compare the authentication information received from the test unit to digest value produced by hashing the random token value and a password shared by the system and the enrollment system; and output a signal indicating that the enrollment instructing is authentic. In some embodiments the enrollment circuitry is further configured to transmit a second random value to the test unit; derive an encryption key from the second random value; and encrypt the response data using the encryption key.

In some embodiments, PUF array comprises PUF devices of one of the following types: SRAM cells; ring oscillator circuits; gate delay circuits; resistive memory devices; ferroelectric memory devices; phase change memory devices; magnetic memory devices; flash memory devices; and one-time programmable memory devices.

In another embodiment, a system comprises processing circuitry and a communication interface coupled to the processing circuitry; a physical unclonable function (PUF) array of PUF devices; interrogation circuitry coupled to the processing circuitry and the PUF array and configured to measure physical characteristics of the PUF devices; and memory coupled to the processing circuitry and storing instructions. The instructions, when executed by the processing circuitry, cause the system to receive an enrollment instruction via the communication interface from an enrollment system; receive authentication information from the enrollment system via the communication interface; determine, using the authentication information, that the enrollment instruction is authentic; and generate a set of challenges. Executing the instructions further causes the system to generate a corresponding set of responses to the set of challenges by causing the interrogation circuitry to measure physical characteristic values of PUF devices identified by each challenge of the set of challenges; and outputting response data for that challenge that indicates an expected response to that challenge using the measured physical characteristic values of the of PUF devices identified by that challenge. Executing the instructions further causes the system to encrypt response data indicating the response to each challenge of the set of challenges; and transmit the encrypted response data to the enrollment system via the communication interface.

In another embodiment, a method comprises detecting the presence of a test unit connected to a communication interface via a communication port of an electronic device having a physical unclonable function (PUF) array of PUF devices; receiving an enrollment instruction via the communication interface from the test unit; receiving authentication signals from the test unit via the communication interface; determining, using the authentication signals, that the enrollment instruction is authentic; and generating a set of challenges. The method further comprises generating a corresponding set of responses to the set of challenge instructions by causing interrogation circuitry coupled to the PUF array to measure physical characteristic values of PUF devices identified by each challenge of the set of challenges; and outputting response data for that challenge that indicates an expected response to that challenge using the measured physical characteristic values of the of PUF devices identified by that challenge. The method further comprises encrypting response data indicating the response to each challenge of the set of challenges; and transmitting the encrypted response data to the test unit.

The described features, advantages, and characteristics may be combined in any suitable manner in one or more embodiments. One skilled in the relevant art will recognize that the circuit may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus appearances of the phrase "in one embodiment," "in an embodiment," and similar language throughout this specification may, but do not necessarily, all refer to the same embodiment.

The invention claimed is:

1. A system, comprising:
   processing circuitry and a communication interface coupled to the processing circuitry;
   a physical unclonable function (PUF) array of PUF devices;
   interrogation circuitry coupled to the processing circuitry and the PUF array and configured to measure physical characteristics of the PUF devices; and
   memory coupled to the processing circuitry and storing instructions that, when executed by the processing circuitry, cause the system to:
     receive an enrollment request via the communication interface from an enrollment system;
     transmit a random token value to the enrollment system via the communication interface;
     receive authentication information from the enrollment system via the communication interface, the authentication information based on the random token value and information previously shared between the system and the enrollment system;
     determine, using the authentication information, that the enrollment request is authentic;
     generate a set of challenges;
     generate a corresponding set of responses to the set of challenges by:
       causing the interrogation circuitry to measure physical characteristic values of PUF devices identified by each challenge of the set of challenges; and
       outputting response data for that challenge based on that challenge using the measured physical characteristic values of the of PUF devices identified by that challenge;
     encrypt response data indicating the response to each challenge of the set of challenges; and
     transmit the encrypted response data to the enrollment system via the communication interface.

2. The system of claim 1, wherein the instructions, when executed to generate the set of challenges, cause the system to use the processing circuitry to:

output, as the set of challenges, a set of pseudo-random numbers determined by a seed value derived from a first random number and the authentication information received from the enrollment system.

3. The system of claim 1, wherein the instructions, when executed to cause the interrogation circuitry to measure the physical characteristic values of the PUF devices identified by each challenge, cause interrogation circuitry to:
repeatedly measure a physical characteristic of each PUF device identified by that challenge; and
output, as the measured physical characteristic value of each PUF device, data indicating one or more statistical properties of the repeatedly measured physical characteristic of that PUF device.

4. The system of claim 1, wherein the information previously shared between the system and the enrollment system includes a password, and the instructions, when executed by the processing circuitry, further cause the system to:
compare the authentication information received from the enrollment system to a digest value produced by hashing the random token value and the password shared by the system and the enrollment system; and
output a signal indicating that the enrollment request is authentic.

5. The system of claim 1, wherein the instructions, when executed by the processing circuitry, further cause the system to:
transmit a second random value to the enrollment system;
derive an encryption key from the second random value; and
encrypt the response data using the encryption key.

6. The system of claim 1, wherein the PUF array comprises PUF devices of one of the following types:
SRAM cells;
ring oscillator circuits;
gate delay circuits;
resistive memory devices;
ferroelectric memory devices;
phase change memory devices;
magnetic memory devices;
flash memory devices; and
one-time programmable memory devices.

7. A system, comprising:
enrollment circuitry and a communication interface coupled to the enrollment circuitry and a communication port;
a physical unclonable function (PUF) array of PUF devices;
interrogation circuitry coupled to the enrollment circuitry and the PUF array and configured to measure physical characteristics of the PUF devices;
wherein the enrollment circuitry is configured to:
detect the presence of a test unit connected to the communication interface via the communication port;
receive an enrollment request via the communication interface from the test unit;
transmit a random token value to the test unit via the communication interface;
receive authentication signals from the test unit via the communication interface, the authentication signals based on the random token value and information previously shared between the system and the test unit;
determine, using the authentication signals, that the enrollment request is authentic;
generate a set of challenges;
generate a corresponding set of responses to the set of challenges by:
causing the interrogation circuitry to measure physical characteristic values of PUF devices identified by each challenge of the set of challenges; and
outputting response data for that challenge based on the measured physical characteristic values of the of PUF devices identified by that challenge;
encrypt response data indicating the response to each challenge of the set of challenges; and
transmit the encrypted response data to the test unit via the communication port.

8. The system of claim 7, wherein the enrollment circuitry, when generating the set of challenges, generates, as the set of challenges, a set of pseudo-random numbers determined by a seed value derived from a first random number and the authentication signals received from the test unit.

9. The system of claim 7, wherein the enrollment circuitry, when causing the interrogation circuitry to measure the physical characteristic values of the PUF devices identified by each challenge, causes interrogation circuitry to:
repeatedly measure a physical characteristic of each PUF device identified by that challenge; and
output, as the measured physical characteristic value of each PUF device, data indicating one or more statistical properties of the repeatedly measured physical characteristic of that PUF device.

10. The system of claim 7, wherein the information previously shared between the system and the test unit includes a password, and the enrollment circuitry is further configured to:
compare the authentication signals received from the test unit to a digest value produced by hashing the random token value and the password shared by the system and the enrollment circuitry; and
output a signal indicating that the enrollment request is authentic.

11. The system of claim 7, wherein the enrollment circuitry is further configured to:
transmit a second random value to the test unit;
derive an encryption key from the second random value; and
encrypt the response data using the encryption key.

12. The system of claim 7, wherein the PUF array comprises PUF devices of one of the following types:
SRAM cells;
ring oscillator circuits;
gate delay circuits;
resistive memory devices;
ferroelectric memory devices;
phase change memory devices;
magnetic memory devices;
flash memory devices; and
one-time programmable memory devices.

13. A method, comprising:
detecting the presence of a test unit connected to a communication interface via a communication port of an electronic device having a physical unclonable function (PUF) array of PUF devices;
receiving an enrollment request via the communication interface from the test unit;
transmitting a random token value to the test unit via the communication interface;
receiving authentication signals from the test unit via the communication interface, the authentication signals based on the random token value and information previously shared between the test unit and the electronic device;

determining, using the authentication signals, that the enrollment request is authentic;

generating a set of challenges;

generating a corresponding set of responses to the set of challenges by:

causing interrogation circuitry coupled to the PUF array to measure physical characteristic values of PUF devices identified by each challenge of the set of challenges; and outputting response data for that challenge based on the measured physical characteristic values of the PUF devices identified by that challenge;

encrypting response data indicating the response to each challenge of the set of challenges; and transmitting the encrypted response data to the test unit.

14. The method of claim 13, wherein generating the set of challenges comprises outputting, as the set of challenges, a set of pseudo-random numbers determined by a seed value derived from a first random number and the authentication signals received from the test unit.

15. The method of claim 13, wherein causing the interrogation circuitry to measure the physical characteristic values of the PUF devices identified by each challenge comprises causing the interrogation circuitry to:

repeatedly measure a physical characteristic of each PUF device identified by that challenge; and output, as the measured physical characteristic value of each PUF device, data indicating one or more statistical properties of the repeatedly measured physical characteristic of that PUF device.

16. The method of claim 13, wherein the information previously shared between the test unit and the electronic device includes a password, and further comprising:

comparing the authentication signals received from the test unit to a digest value produced by hashing the random token value and a password shared by the electronic device and the test unit; and outputting a signal indicating that the enrollment request is authentic.

17. The method of claim 13, further comprising:

transmitting a second random value to the test unit;

deriving an encryption key from the second random value; and encrypting the response data using the encryption key.

18. The method of claim 13, wherein the PUF array comprises PUF devices of one of the following types:

SRAM cells;

ring oscillator circuits;

gate delay circuits;

resistive memory devices;

ferroelectric memory devices;

phase change memory devices;

magnetic memory devices;

flash memory devices; and one-time programmable memory devices.

\* \* \* \* \*